Jan. 20, 1942.   W. E. BRILL   2,270,500
MAIN BEARING CAP WEDGE
Filed March 21, 1940

Inventor
William E. Brill
Blackmore, Spencer & Flint
Attorneys

Patented Jan. 20, 1942

2,270,500

UNITED STATES PATENT OFFICE 2,270,500

MAIN BEARING CAP WEDGE

William E. Brill, Cleveland, Ohio, assignor to General Motors Corporation, Detroit, Mich., a corporation of Delaware Application March 21, 1940, Serial No. 325,164

2 Claims. (Cl. 308—74)

My invention relates to bearings for supporting the journals of crankshafts of internal combustion engines, steam engines, compressors and similar machines wherein a rotating crankshaft is present; and particularly to means for forcing lower and upper semi-cylindrical bearing members provided for each journal into engagement with seats of like form provided for them in lower bearing supporting members, and in bearing caps disposed above the journal; and which means acts also to hold the bearing members in place relative to the crank shaft journals. The object of my invention is to provide improved means engaging the bearing caps for forcing them downward and holding the bearing members in place within the seats as aforesaid, the same being simple in construction and conveniently accessible for independent adjustment of each bearing and the construction thereof being such that pressure upon the caps of the several bearings will be more uniform per unit areas of the caps than has heretofore commonly been the case.

The drawing accompanying and forming a part of this specification illustrates the preferred form of my invention, and therein:

Figure 1:
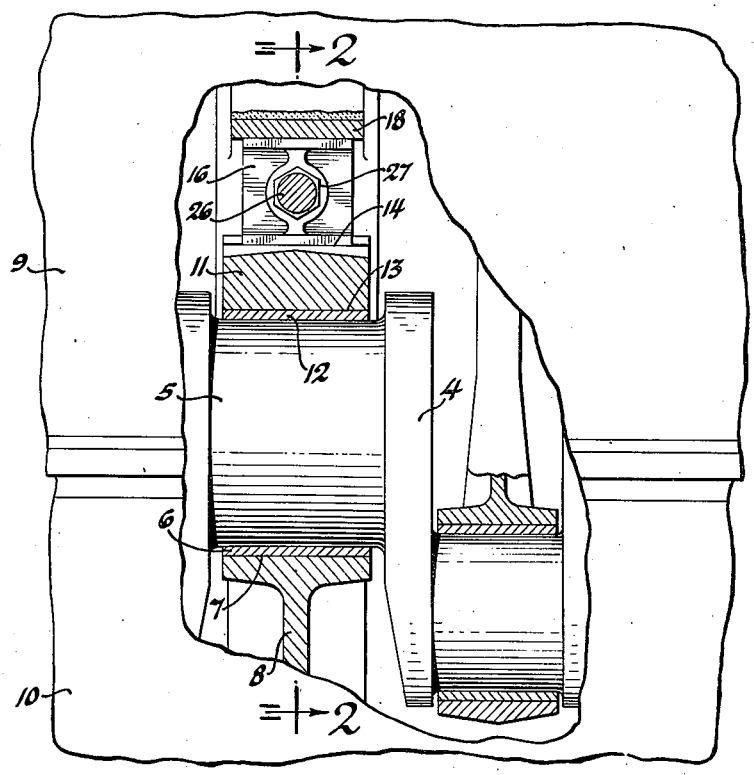
Figure 1 is a fragmentary view showing my invention and adjacent parts of a crankshaft and of an engine frame.

Referring to the drawing, the journals of the crankshaft 4 (of which one only designated by the numeral 5 is shown) are rotatable in lower semi-cylindrical bearings 6 which in turn are supported in seats 7 of like form in lower bearing supporting members 8, which in turn are supported by bolts (not shown) from and below the lower end of a frame member 9 which supports the cylinders of the engine and which, together with a lower part 10, forms a combined frame and crankcase structure therefor. These parts, however, are of common and well-known form and are shown conventionally for the most part.

Figure 2:
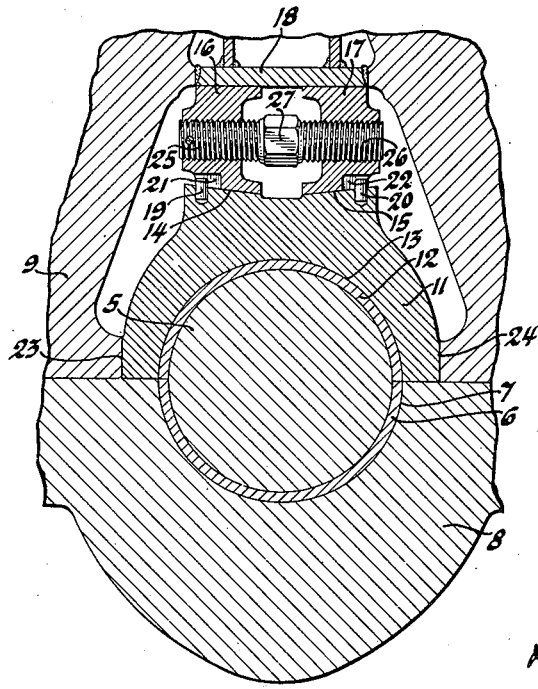
Figure 2 is a similar view showing a section upon a transverse plane perpendicular to the axis of rotation of the crankshaft, as indicated by the line 2—2, Figure 1.

Arranged above each journal 5 is a cap 11 which acts to force an upper semi-cylindrical bearing member 12 against the lower bearing member 6, and to secure intimate contact between said bearing members and semi-cylindrical seats provided in the cap and in the supporting member, as indicated by the numerals 7, 13; and which cap is held in place and forced toward the bearing members by means constructed and acting in accordance with my invention as will next appear. That is, the cap 11 is provided with oppositely located inclined seats 14, 15 upon its upper side; and the numerals 16, 17 designate two oppositely movable wedges the lower surfaces of which are inclined and engage the seats 14, 15 and the upper ends of which are horizontal and move along the under surface of a horizontal abutment plate 18, the two ends of which are supported by the frame member 9, as shown in Figure 2. Guides 19, 20 extend upward from the cap 11 and into slots 21, 22 in the under ends of the wedges 16, 17 to prevent displacement of the wedges, and constrain them to move toward and from one another in a straight line; and sidewise movement of the cap is restrained by engagement between the lower end thereof and abutments upon the frame structure as indicated by the numerals 23, 24.

While only one journal bearing 5 and cap 11 are illustrated and described a like bearing cap and features associated therewith, as hereinbefore described, is commonly present at each of the several journals of the crankshaft.

The wedge members 16, 17 are moved apart simultaneously to force the cap 11 downward by a screw having right and left threaded portions 25, 26 engaging similarly threaded passages in the wedges, and a central portion 27 adapted to receive a wrench for turning the screw. Reverse rotation loosens the cap 11 and permits the installation of new bearing members as will be understood; and the provision of two wedges, and two inclined seats 14, 15, secures an approximately uniform downward pressure throughout the area of the cap and upon the upper bearing member 12.

Having thus described and explained my invention, I claim and desire to secure by Letters Patent:

1. In combination, a fixed lower bearing supporting member having a semi-circular seat; a lower bearing member of like form supported within said seat; an upper semi-cylindrical bearing member contacting with said lower bearing member; a fixed cap arranged above said upper bearing member and the ends of which abut against said lower bearing supporting member, and which cap has a semi-circular seat within which said upper bearing member lies; two transversely movable wedges acting upon said cap to force it downward; a screw located between and having right and left threaded portions which act as compression members against said wedges to move them simultaneously apart from one another; a fixed abutment arranged above and against which said wedges act; and cooperating guides upon said cap and said wedges.

2. In combination, a fixed lower bearing supporting member having a semi-circular seat; a lower bearing member of like form supported within said seat; an upper semi-cylindrical bearing member contacting with said lower bearing member; a fixed cap arranged above said upper bearing member and the ends of which abut against said lower bearing supporting member, and which cap has a semi-circular seat within which said upper bearing member lies; oppositely disposed abutments for restraining sidewise movement of said cap; two transversely movable wedges acting upon said cap at spaced apart points one upon each side of the center thereof; a screw located between and having right and left threaded portions which act as compression members against said wedges to move them simultaneously apart from one another; a fixed abutment arranged above and against which said wedges act; and cooperating guides upon said cap and said wedges.

WILLIAM E. BRILL.